United States Patent [19]

Ichiki et al.

[11] Patent Number: 4,907,865
[45] Date of Patent: Mar. 13, 1990

[54] VARIABLE MAGNIFICATION DUPLICATOR LENS SYSTEM

[75] Inventors: Aiko Ichiki; Nagayoshi Hirano, both of Omiya, Japan

[73] Assignee: Fuji Photo Optical Co., Ltd., Omiya, Japan

[21] Appl. No.: 289,269

[22] Filed: Dec. 23, 1988

[30] Foreign Application Priority Data

Dec. 25, 1987 [JP] Japan .................... 62-331378

[51] Int. Cl.$^4$ .................... G02B 15/00; G02B 9/62
[52] U.S. Cl. .................... 350/425; 350/464
[58] Field of Search ............. 350/425, 423, 427, 464

[56] References Cited

U.S. PATENT DOCUMENTS

| | | | |
|---|---|---|---|
| 3,728,010 | 4/1973 | Mikami | 350/425 |
| 3,865,470 | 2/1975 | McCrobie et al. | 350/425 |
| 3,905,685 | 9/1975 | Harper et al. | 350/425 |
| 3,912,374 | 10/1975 | Liu | 350/425 |
| 3,973,831 | 8/1976 | Minoura | 350/425 |
| 4,061,419 | 12/1977 | Price et al. | 350/425 |
| 4,735,496 | 4/1988 | Arai | 350/425 |

Primary Examiner—Scott J. Sugarman
Attorney, Agent, or Firm—Oblon, Spivak, McClelland, Maier & Neustadt

[57] ABSTRACT

A variable scale duplicator lens system, including: front and rear lens group each consisting of three lenses and located on the opposite sides of a stop, the front group on the side of the subject and the rear group on the image-forming side; the front group on the subject side including a 1st lens consisting of a meniscus lens of positive power facing the convex side thereof toward the subject, a 2nd lens consisting of a meniscus lens having negative power facing the convex side thereof toward the subject, and a 3rd lens of positive power; the rear lens group including 4th to 6th lenses arranged symmetrically with the 1st to 3rd lenses of the front lens group, respectively. Of these six lens members, at least one of the 1st and 6th lenses is movable. When the lens system as a whole is shifted along the optical axis for magnification of copy scale, the lens position is adjusted at least by shifting the 6th lens toward the 5th lens or by shifting the 1st lens away from the 2nd lens in case of reduction of copy scale, and the lens position is adjusted at least by shifting the 1st lens toward the 2nd lens or by shifting the 6th lens away from the 5th lens in case of enlargement of copy scale.

7 Claims, 12 Drawing Sheets

COMA ABERRATION

SPHERICAL
ABERRATION

ASTIGMATISM

DISTORTION

COMA ABERRATION

SPHERICAL ABERRATION

Fig. 4B

ASTIGMATISM

Fig. 4C

DISTORTION

COMA ABERRATION

SPHERICAL
ABERRATION

Fig. 5B

ASTIGMATISM

Fig. 5C

DISTORTION

COMA ABERRATION

SPHERICAL ASTIGMATISM DISTORTION
ABERRATION

COMA ABERRATION

SPHERICAL ASTIGMATISM DISTORTION
ABERRATION

COMA ABERRATION

SPHERICAL
ABERRATION

Fig. 8B

ASTIGMATISM

Fig. 8C

DISTORTION

COMA ABERRATION

SPHERICAL
ABERRATION

Fig. 9B

ASTIGMATISM

Fig. 9C

DISTORTION

COMA ABERRATION

SPHERICAL
ABERRATION

Fig. 10B

ASTIGMATISM

Fig. 10C

DISTORTION

COMA ABERRATION

SPHERICAL
ABERRATION

Fig. 11B

ASTIGMATISM

Fig. 11C

DISTORTION

VARIABLE MAGNIFICATION DUPLICATOR LENS SYSTEM

BACKGROUND OF THE INVENTION

1. Field of the Invention

This invention relates to a variable magnification lens system to be used on copying machines, and more particularly to a variable magnification duplicator lens system which is improved in copying performance quality over a wide magnification range.

2. Description of the Prior Art

The duplicator lens systems are generally required to meet the following conditions.

(1) For imaging a flat subject (an original) on a flat surface, the lens system is desired to have, along with uniform image resolution over the entire field area, good image surface characteristics holding the field curvature and astigmatism to the minimum;

(2) The aperture efficiency should be 100% to suppress drops in light amount in peripheral portions of the field area:

(3) The lens system should be compact and have a wide angle of field to meet the demands for compact and small-size copying machines;

(4) The distortion should be ignorably small;

(5) The contrast should have high enough over the entire variable magnification range, especially, in the low frequency range;

(6) The lens system should be bright in terms of light passing power to permit high speed copying operations; and (7) The system should be composed of a minimum number of lens elements of inexpensive glass material.

Considering that recent copying machine specifications generally include enlarged- and reduced-scale copying functions. In such a magnified duplication, the lens system should satisfy the above-stated requirements.

In order to avoid deteriorations in performance quality in reduced- and enlarged-scale copying operations, it has been known to change the copy scale without varying the distance from an original surface to a sensitive material surface as described, for example, in U.S. Pat. No. 3,865,470 using the so-called zoom lens unit. However, in consideration of the problems which are encountered in case of the zoom lens with a complicate scale varying mechanism, namely, the problems such as increase of the unit size, difficulties of making designs for high performances, increase in cost etc., it has been the general practice to use, instead of a zoom lens unit, a fixed-focus lens unit on ordinary copying machines for office use. In addition, where a fixed focal point lens is used, the so-called symmetrical lens system which has the lens elements arranged symmetrically relative to a stop is employed in most cases to prevent distortion and lateral chromatic aberrations in the position of the natural or equivalent scale which is regarded as a reference scale.

Figure 13:
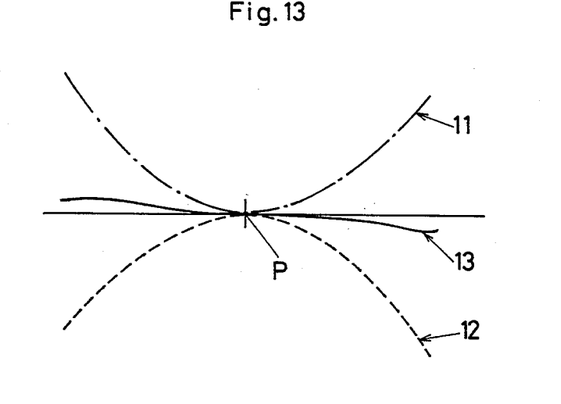
FIG. 13 is a diagram explaining coma aberration of a conventional symmetrical type lens in equivalent scale position.

In a symmetrical lens system of this sort, the lens groups on the opposite sides of a stop are inverse to each other in refractive action. Accordingly, as clear from FIG. 13 which explains coma aberrations of a typical symmetrical lens system in equivalent scale position, the coma aberrations of the system as a whole can be corrected by making an adjustment such that the simple coma aberration 11 which is produced by overcorrection of a front lens group on the front side of a stop becomes substantially symmetric relative to the principal light ray P to offset same by the undercorrective coma aberration 12 which is produced by a rear lens group substantially symmetrically relative to the principal light ray P.

In case of a fixed focal point lens unit, its position has to be shifted for a magnified duplication, i.e., toward the original surface (for duplication on an enlarged scale) and toward the sensitive material (for duplication on a reduced scale).

Figure 14:
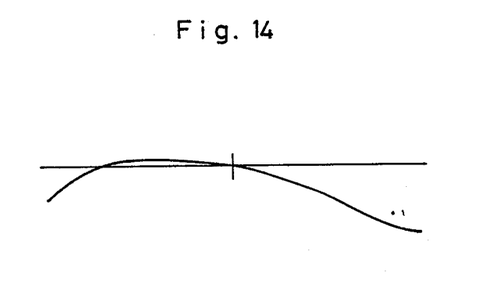
FIG. 14 is a diagram showing the trend of coma aberration in reduced scale position maintaining the same axial space lengths as in the equivalent scale position.

In reduced scale position, the upper light rays above the principal light ray pass through the front lens system close to its optical axis without undergoing strong refractive action of the front lens system, but as they pass through the rear lens system at a position away from its optical axis they undergo its strong converging action, producing undercorrective coma aberration. On the other hand, the lower light rays have a smaller angle of incidence to the front lens system than in the equivalent scale position, and therefore undergo the refraction by the lens system in a weakened degree, producing undercorrective coma aberration as shown in FIG. 14 and exhibiting considerable deteriorations especially in tangential coma aberration.

Figure 15:
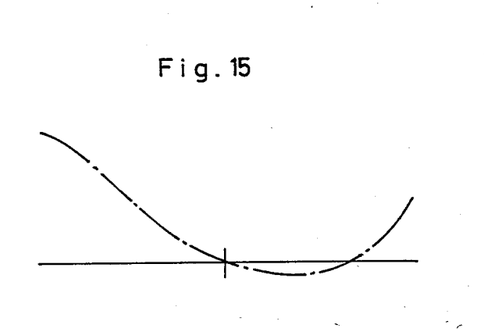
FIG. 15 is a diagram showing the trend of coma aberration in enlarged scaled position maintaining the same axial space lengths as in the equivalent scale position.

In enlarged scale position, the upper light rays above the principal light ray P of the rear lens system undergo weakly converging refractive action, changing from undercorrective coma aberration to somewhat overcorrective coma aberration. The lower light rays undergo strong converging action as the angle of incidence to the front lens system is increased as compared with that of the equivalent scale position, producing overcorrective coma aberration and as a whole resulting in overcorrective coma aberration as shown in FIG. 15.

It has been the general practice to prevent the deteriorations in lens performance in enlarged and reduced scale positions of such a fixed-focus lens either by limiting the copy magnification to a narrow range where the performance quality is practically acceptable or by sacrificing the brightness or high light transmitting power of the lens or by restricting the angle of field.

SUMMARY OF THE INVENTION

Under these circumstances, the present invention has as its primary object the provision of a variable magnification duplicator lens system which can maintain satisfactory lens performance over a wide range of copy scale reduction and enlargement.

It is another object of the invention to provide a variable scale duplicator lens system which can effectively correct coma aberration as would occur at the time of reduction and enlargement of the copy scale.

It is still another object of the invention to provide a variable scale duplicator lens system which permits to correct aberrations by the use of a reduced number of lens elements without resorting to costly glass material and which is capable of duplication of a wide field angle with a relatively long focal length.

It is a further object of the invention to provide a variable scale duplicator lens system which can effect correction of aberrations by the use of a simple mechanism.

In accordance with the present invention, the above-mentioned objects are achieved by a variable magnification duplicator lens system which comprises:

front and rear lens groups each consisting of three lens elements and located on the opposite sides of a stop, one on the side of the subject and the other on the image forming side;

the front lens group on the subject side of the stop including a 1st lens element consisting of a meniscus lens having positive power and facing the convex side thereof toward the subject, a 2nd lens element consisting of a meniscus lens having negative power and facing the convex side thereof toward the subject, and a 3rd lens element having positive power;

the rear lens group on the image-forming side of the stop including 4th to 6th lens elements arranged symmetrically with the 1st to 3rd lens elements of the front lens group, respectively;

at least one of the above-mentioned 1st and 6th lens elements being movable;

the lens system being moved as a whole in the direction of the optical axis at the time of varying the copy scale;

in reduced scale position, the lens position being adjusted at least by shifting the 6th lens element toward the 5th lens element or by shifting the 1st lens element away from the 2nd lens element; and in enlarged scale position, the lens position being adjusted at least by shifting the 1st lens element toward the 2nd lens element or shifting the 6th lens elements away from the 5th lens element.

The above and other objects, features and advantages of the invention will become apparent from the following particular description of the invention, taken in conjunction with the accompanying drawings.

BRIEF DESCRIPTION OF THE DRAWINGS

In the accompanying drawings;

FIGS. 3(a-f), 4(a-f) and 5(a-f) are aberration diagrams where the values of the first embodiment of the invention in magnifying position are applied without shifting the lens elements;

FIGS. 6(a-f), 7(a-f) and 8(a-d) are aberration diagrams where the embodiment 1 of the invention is set in −0.5x position, varying $\Delta t_2$ and $\Delta t_{10}$ in various combinations while holding $\Delta t$ of the conditional formula (1) constantly at 0.0026;

FIGS. 9(a-f), 10(a-f) and 11(a-f) are aberration diagrams where the embodiment 1 of the invention is set in −2.0x position, varying $\Delta t_2$ and $\Delta t_{10}$ in various combinations while holding $\Delta t$ of the conditional formula (1) constantly at −0.0026;

PARTICULAR DESCRIPTION OF THE INVENTION

Figure 1:
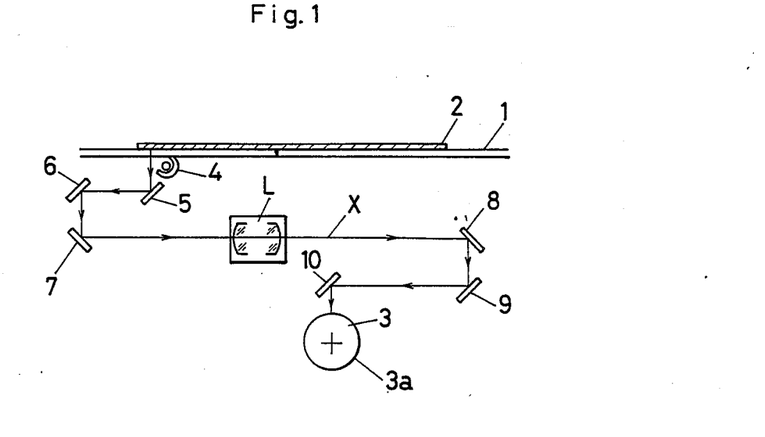
FIG. 1 is a diagrammatic illustration of the general arrangement of duplicator optical system.

Referring first to FIG. 1, denoted at 1 is an original mount surface, at 2 is an original which is set on the original mount surface 1, at 3 is a photosensitive drum with a sensitive surface 3a on its circumference, and at 4 is a light source. Provided in the light path X leading from the original surface 1 to the sensitive surface 3a are six mirrors 5 to 10 which serve to bend the light path at right angles. A duplicator lens system L is interposed between the 3rd and 4th mirrors 7 and 8.

For making copies on enlarged and reduced scales by the use of the above-described duplicator optical system, the duplicator lens system L is shifted in the direction of its optical axis while holding the original mount surface 1 and the sensitive surface 3a stationary. In order to correct the variations which occur in the conjugate distances as a result of a change of magnification rate, either the 2nd mirror 6 and the 3rd mirror 7 are shifted integrally in the direction of the optical axis, or the 4th mirror 8 and the 5th mirror 9 are shifted integrally in the direction of the optical axis. At this time, the relationship between the displacement of the lens system L and the displacement of the mirror 6 and 7 or the mirrors 8 and 9 is nonlinear, so that a cam mechanism (not shown) can be used suitably to shift them in an interlinked fashion.

Figure 2:
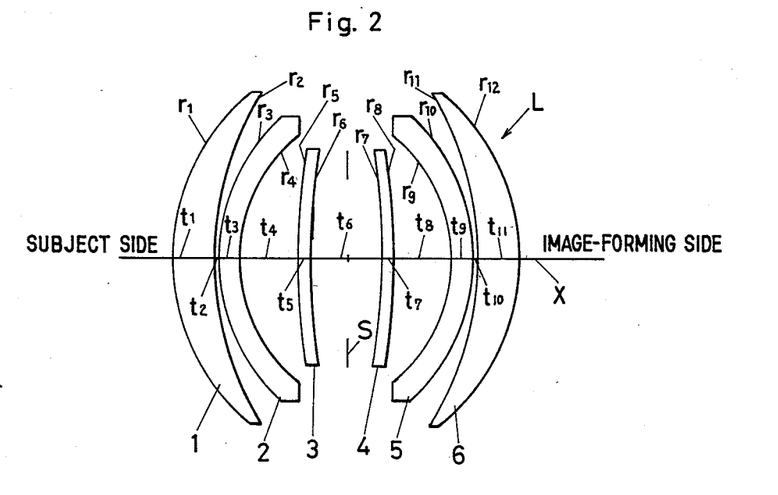
FIG. 2 is a diagrammatic illustration of the construction of a variable magnification duplicator lens system according to the present invention.
Figure 3A:
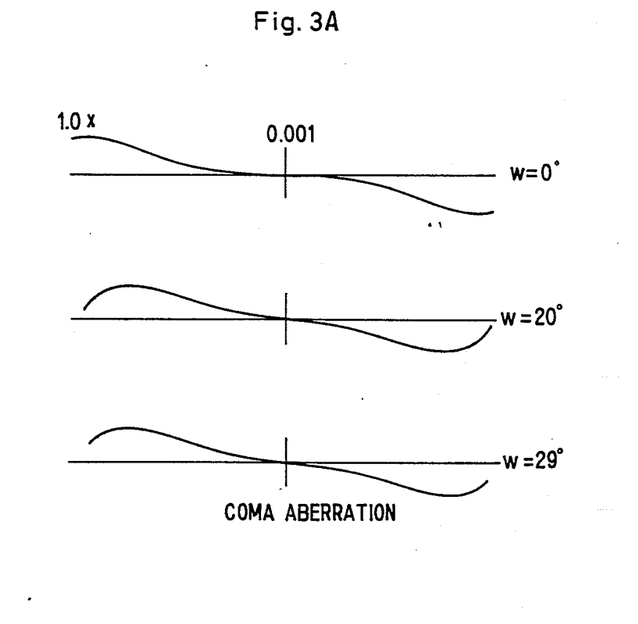
Figure 3B:
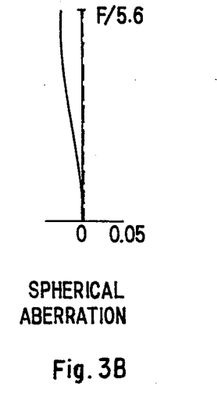
Figure 3C:
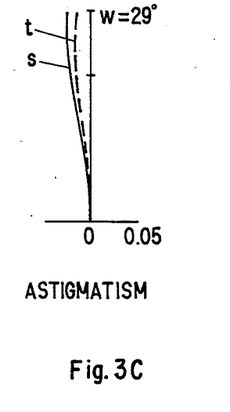
Figure 3D:
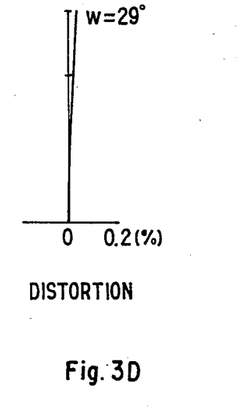

The duplicator lens system L consists of six lens elements $L_1$ to $L_6$ which are located as shown in FIG. 2 when in equivalent scale copy position. More specifically, a group of three lens elements are located on the front side of a stop S (on the side of the original mount surface 1), and a group of similar three lens elements are located on the rear side of the stop S (on the side of the sensitive surface 3a). The front lens group is composed of, from the subject side, a 1st lens element $L_1$ consisting of a meniscus lens having positive power and facing the convex side thereof toward the subject, a 2nd lens element $L_2$ consisting of a meniscus lens having negative power and facing the convex side thereof toward the subject, and a 3rd lens element $L_3$ having positive power. The rear lens group is composed of three similar lens elements $L_4$ to $L_6$ which are arranged symmetrically with the lenses $L_1$ to $L_3$, respectively.

Of the above-mentioned lens elements $L_1$ to $L_6$, the 2nd and 5th lens elements $L_2$ and $L_5$ are fixed, while the lens elements $L_1$ and $L_6$ are movable within a lens barrel in the direction of the optical axis. The shifts of position of these movable lens elements can be effected by the use of a motor and cam mechanism or the like.

The movable lens elements which constitute part of the lens system L are shifted in the direction of the optical axis to correct the aberrations which would be produced in magnified scale positions. In FIG. 2, in equivalent scale position the 1st and 2nd lens elements $L_1$ and $L_2$ are located at an axial space of $t_2$, the 2nd and 3rd lens elements $L_2$ and $L_3$ at an axial space of $t_4$, the 3rd and 4th lens elements at an axial space of $t_6$, the 4th and 5th lens elements $L_4$ and $L_5$ at an axial space of $t_8$, and the 5th and 6th lens elements $L_5$ and $L_6$ at an axial space of $t_{10}$, shifting the movable ones of the lens elements $L_1$ to $L_6$ in reduced and enlarged scale positions in the manner as described below.

For copying on reduced scale, the lens system L as a whole is shifted toward the image-forming side from the equivalent scale position. Simultaneously, the 6th lens element $L_6$ is shifted toward the 5th lens element $L_5$ to narrow the axial space $t_{10}$ between these elements. As a result, it becomes possible to correct the undercorrective coma aberration which could not be corrected simply by the shift of the lens system itself.

For duplication on enlarged scale, the lens system L as a whole is shifted toward the subject from equivalent scale position. At this time, in interlinked relation with the shift of the whole lens system L, the 1st lens element $L_1$ is shifted toward the 2nd lens element $L_2$ to narrow the axial space $t_2$ between these two elements. This rectifies the overcorrective coma aberration in the enlarged scale position, which cannot be straightened out by the shift of the entire lens system L alone.

In this instance, it is preferred that the shifts of the above-described movable lens elements are in the ranges which satisfy the following conditions. Namely, in case of scale reduction:

$$-0.00216 \log|m| < \frac{\Delta t}{f} < -0.0123 \log|m| \quad (1)$$

and in case of scale enlargement:

$$-0.0123 \log|m| < \frac{\Delta t}{f} < -0.00216 \log|m| \quad (2)$$

wherein
f: focal length of the entire system;
m: magnification;
$\Delta t$: $\Delta t_2 - \Delta t_{10}$;
$\Delta t_2$: the variation of axial space $t_2$ based on the length in equivalent scale position;
$\Delta t_{10}$: the variation of axial space $t_{10}$ based on the length in equivalent scale position.

Here, the condition (1) determines the value of $\Delta t$ which is the difference between the variations $\Delta t_2$ and $\Delta t_{10}$ in reduced scale position. If the value $\Delta t$ becomes greater than the upper limit, the undercorrective coma aberration turns to overcorrection, contrary to the objective of improving the optical performance quality by enhancing the MTF value by about 10% or more as compared with the uncorrected condition, thus failing to achieve the improvement in performance quality by conversely leaving coma aberration in the undercorrected state or increasing undercorrective coma aberration due to inappropriate correction.

The condition (2) determines the value of $\Delta t$ which is the difference between the variations $\Delta t_2$ and $\Delta t_{10}$ in enlarged scale position. If the value of $\Delta t$ is increased beyond the upper limit, the overcorrective coma aberration is corrected excessively toward the under-corrective side, as a result deteriorating the MTF value. Where it is minimized below the lower limit, the improvement in performance quality cannot be expected since conversely it becomes difficult to straighten the overcorrective coma aberration.

In this instance, since the value of $\Delta t$ in the above-defined conditions (1) and (2) is $\Delta t_2 - \Delta t_{10}$, the following lens shifts become possible.

Namely, it is possible, for duplication on reduced scale, to shift the 6th lens element $L_6$ toward the 5th lens elements $L_5$ to vary $t_{10}$, and, for duplication on enlarged scale, to shift the 1st lens element $L_1$ toward the 2nd lens element $L_2$ to vary $t_2$.

Alternatively, in reduced scale position, the 1st lens element $L_1$ is shifted away from the 2nd lens element $L_2$ to vary $t_2$, and, in enlarged scale position, the 6th lens element $L_6$ is shifted away from the 5th lens element $L_5$ to vary $t_{10}$.

It is also possible to move one of the 1st and 6th lens elements $L_1$ and $L_6$ and fix one of the axial space $t_2$ and $t_{10}$, broadening or narrowing the other axial space in the reduced and enlarged scale positions. Where a single lens element is shifted in this manner, the lens drive mechanism can be simplified to a considerable degree.

Further, it becomes possible to correct on-axis aberration smoothly in a case where both of the axial space $t_2$ and $t_{10}$ are adjusted in each of the reduced and enlarged scale positions. This is desirable also from the standpoint of correction of aberration since off-axis aberration can be corrected in good balance with the correction of on-axis aberration.

In such a case, needless to say, the conditions (1) and (2) have to be satisfied in the reduced and enlarged scale positions, respectively.

Embodiment

Setting $f = 1.0$
F No = 5.6 ($\infty$),
half angle of field = 29° (on 1:1 scale), and
magnification range = $-0.5x - -2.0x$

Figure 4A:
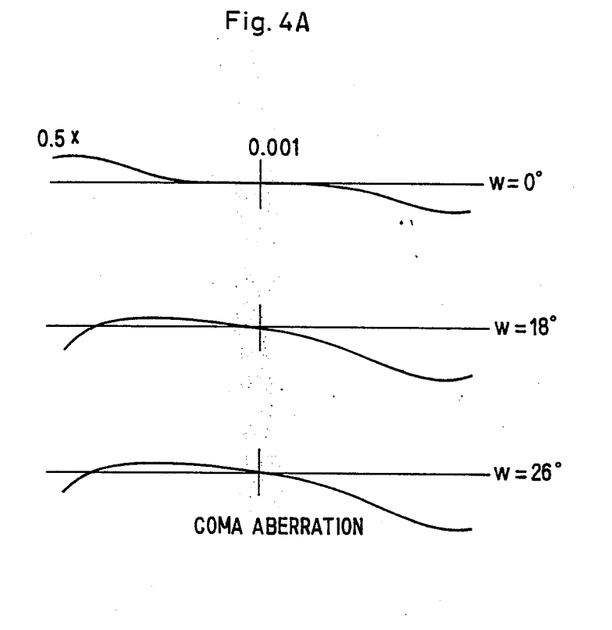
Figure 4B:
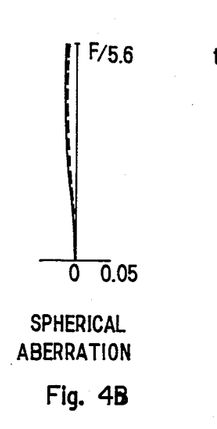
Figure 4C:
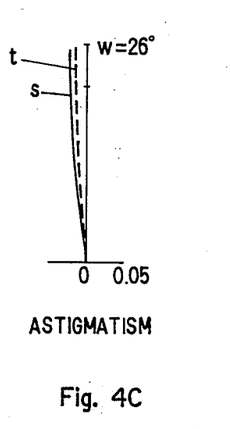
Figure 4D:
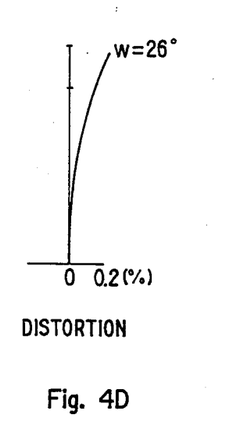
Figure 5A:
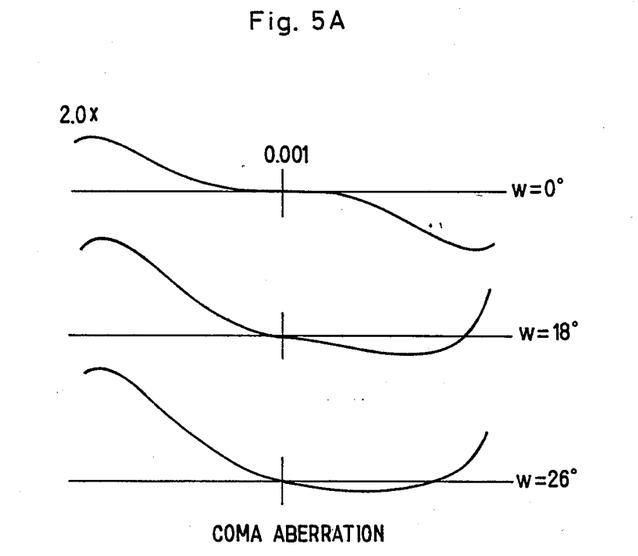
Figure 5B:
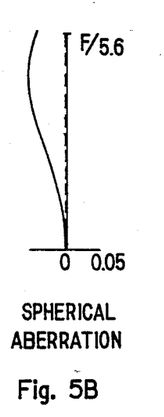
Figure 5C:
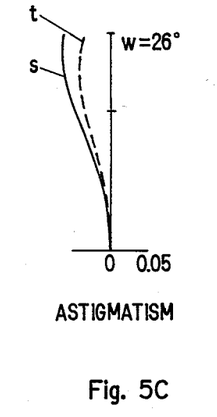
Figure 5D:
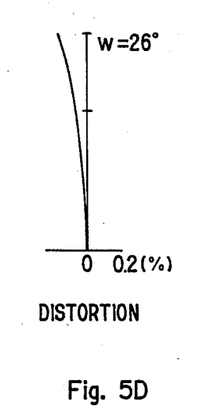
Figure 6A:
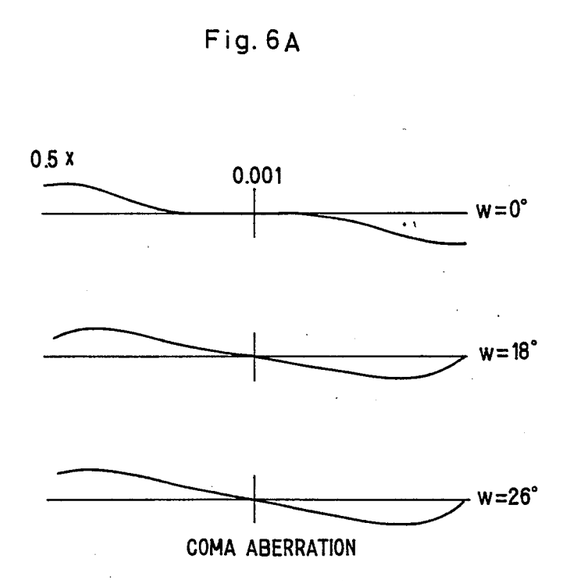
Figure 6B:
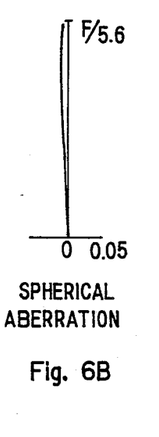
Figure 6C:
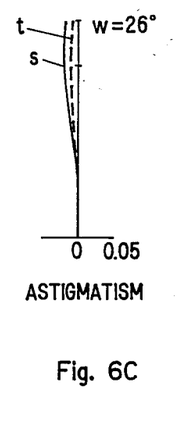
Figure 6D:
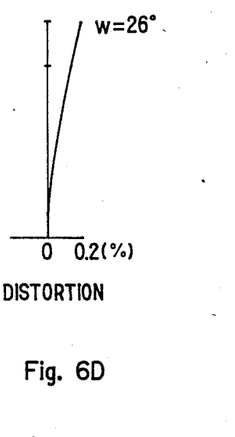
Figure 7A:
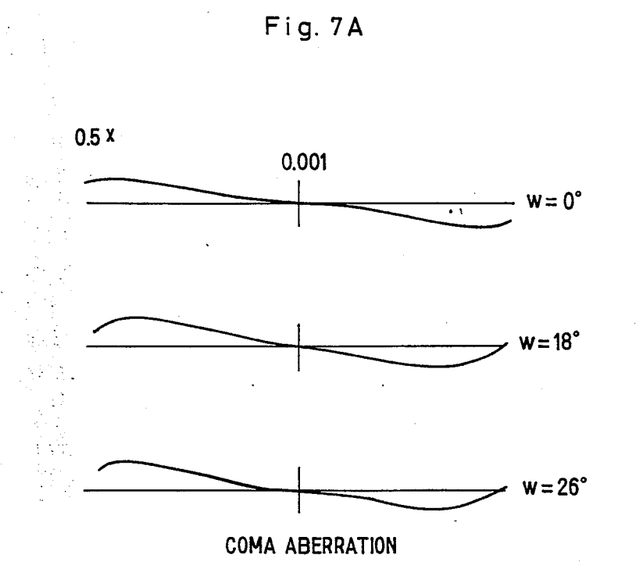
Figure 7B:
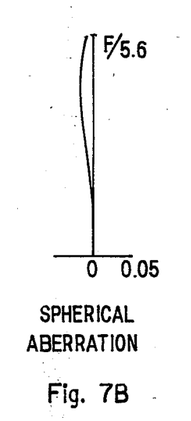
Figure 7C:
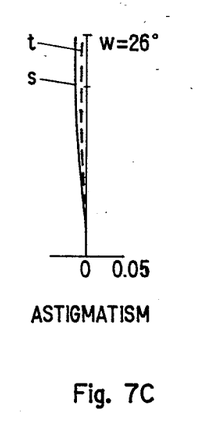
Figure 7D:
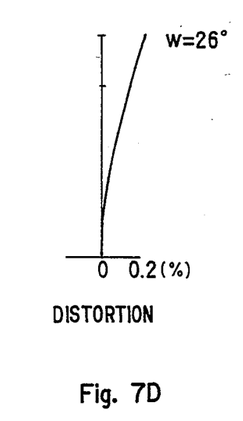
Figure 8A:
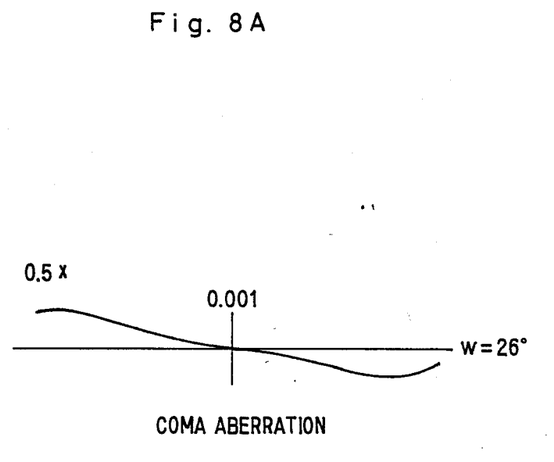
Figure 8B:
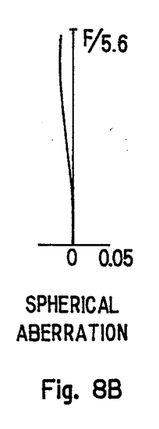
Figure 8C:
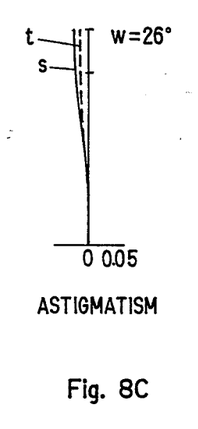
Figure 8D:
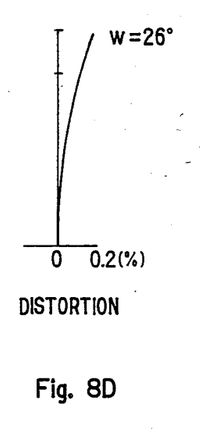

| | | | |
|---|---|---|---|
| $r_1 = 0.188$ | $t_1 = 0.040$ | $N_1 = 1.64850$ | $v_1 = 53.0$ |
| $r_2 = 0.292$ | $t_2 = 0.004$ | $N_2 = 1.76182$ | $v_2 = 26.5$ |
| $r_3 = 0.180$ | $t_3 = 0.0190$ | $N_3 = 1.51633$ | $v_3 = 64.1$ |
| $r_4 = 0.136$ | $t_4 = 0.054$ | $N_4 = 1.51633$ | $v_4 = 64.1$ |
| $r_5 = 0.547$ | $t_5 = 0.013$ | $N_5 = 1.76182$ | $v_5 = 26.5$ |
| $r_6 = 0.663$ | $t_6 = 0.064$ | $N_6 = 1.64850$ | $v_6 = 53.0$ |
| $r_7 = -0.663$ | $t_7 = 0.013$ | | |
| $r_8 = -0.547$ | $t_8 = 0.054$ | | |
| $r_9 = -0.136$ | $t_9 = 0.019$ | | |
| $r_{10} = -0.180$ | $t_{10} = 0.004$ | | |
| $r_{11} = -0.292$ | $t_{11} = 0.040$ | | |
| $r_{12} = -0.188$ | | | | where
$r_i$ = radius of curvature
$t_i$ = axial space length
$N_i$ = the refractive index for line d
$V_i$ = Abbe number
Reduced scale ($-0.5x$), $\Delta t = 0.0026$
Enlarged scale ($-2.0x$), $\Delta t = -0.0026$ FIGS. 3(a-f), 4(a-f) and 5(a-f) are aberration diagrams in those cases using the values in equivalent scase position of the above-described embodiment 1 and magnifying the copy scale without changing the axial space lengths $t_2$ and $t_{10}$.

FIGS. 3(a-f) are aberration diagrams in the equivalent scale position, FIGS. 4(a-f) are aberration diagrams in the position of $-0.5x$, and FIGS. 5(a-f) are aberration diagrams in the position of $-2.0x$.

FIGS. 6 (a-f) are aberration diagrams where $\Delta t_2 = 0.0013$, $\Delta t_{10} = -0.0013$ and $\Delta t = 0.0026$.

FIGS. 7 (a-f) are aberration diagrams where $\Delta t_2 = 0.0$, $\Delta t_{10} = -0.0026$ and $\Delta t = 0.0026$.

FIGS. 8 (a-d) are aberration diagrams where $\Delta t_2 = 0.0026$, $\Delta t_{10} = 0.0$ and $\Delta t = 0.0026$.

Figure 9A:
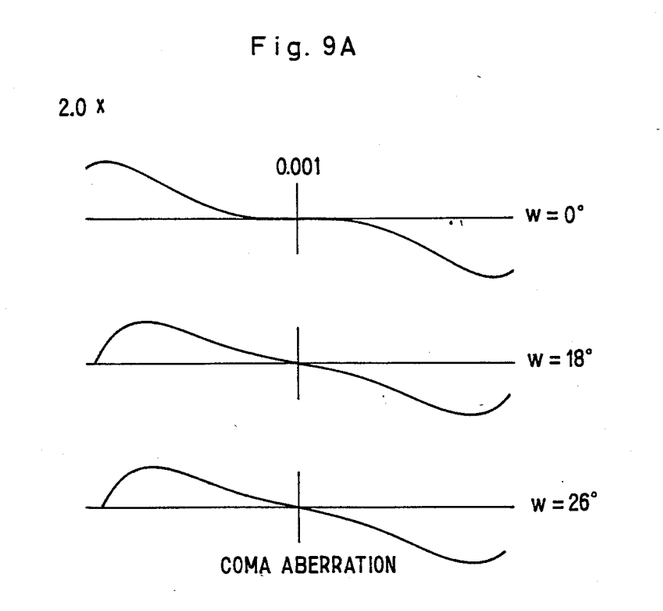
Figures 9B, 9C:
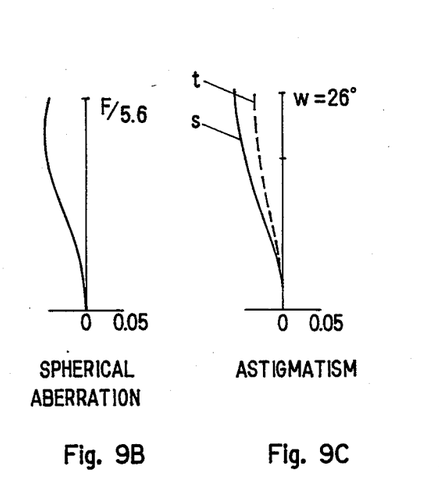
Figure 9D:
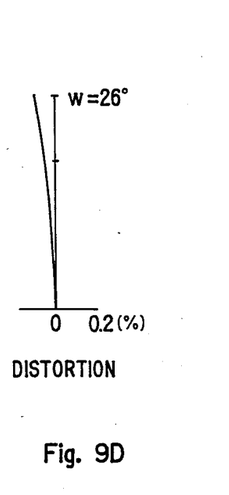
Figure 10A:
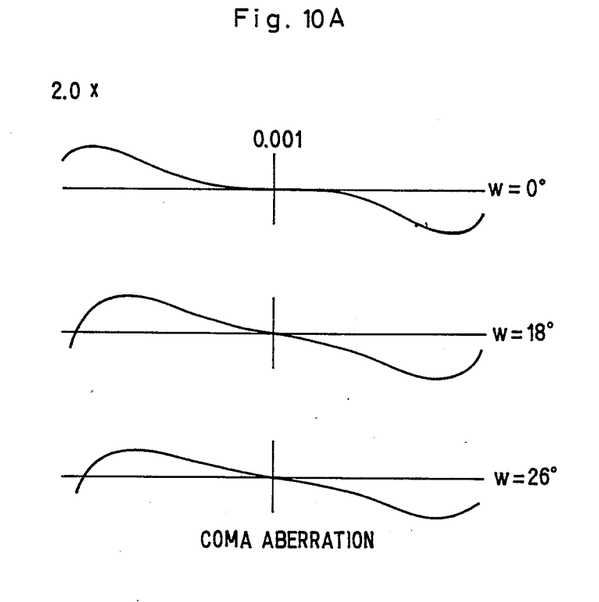
Figure 10B:
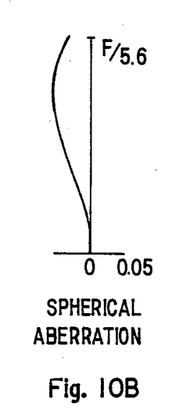
Figure 10C:
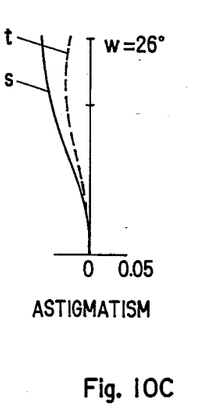
Figure 10D:
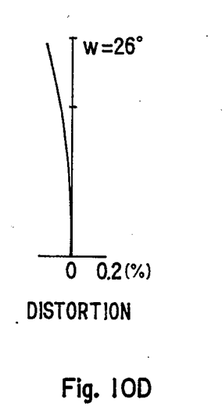
Figure 11A:
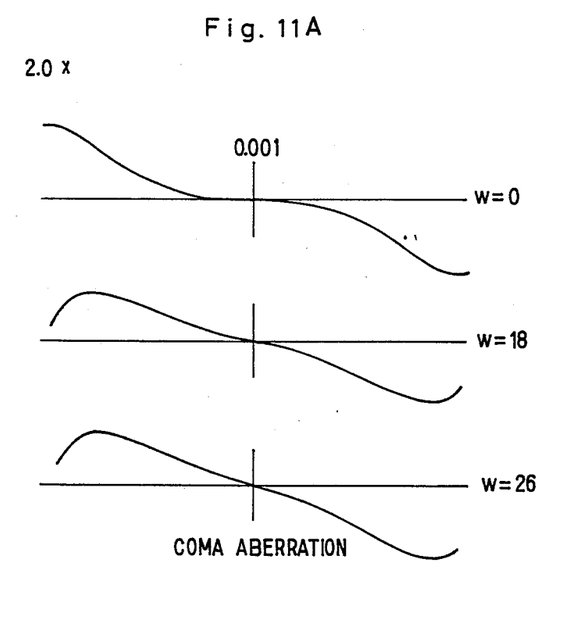
Figure 11B:
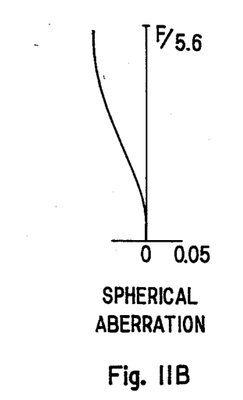
Figure 11C:
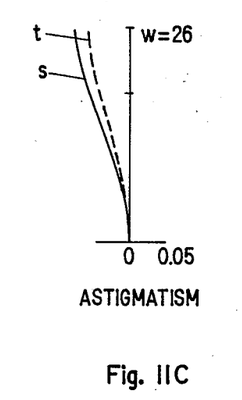
Figure 11D:
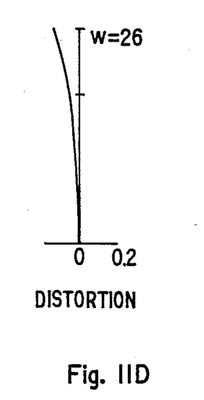

FIGS. 9 (a-f), 10(a-f) and 11(a-f) are aberration diagrams in those cases where the lens system of the above-described embodiment 1 was set in $-2.0x$ position, varying $\Delta t_2$ and $\Delta t_{10}$ into various combinations while holding $\Delta t$ constantly at $-0.0026$.

FIGS. 9(a-f) are aberration diagrams where $\Delta t_2 = -0.0013$, $\Delta t_{10} = 0.0013$ and $\Delta t = -0.0026$.

FIGS. 10 (a-f) are aberration diagrams where $\Delta t_2 = -0.0026$, $\Delta t_{10} = 0.0$ and $\Delta t = -0.0026$.

FIGS. 11(a-f) are aberration diagrams where $\Delta t_2 = 0.0$, $\Delta t_{10} = 0.0026$ and $\Delta t = -0.0026$.

It will be seen that the coma aberrations in magnified scale positions shown in the diagrams of FIGS 6 to 11 are improved as compared with the coma aberrations in FIGS. 3 to 5 magnifying the copy scale without changing the space of equivalent scale position.

Figure 12:
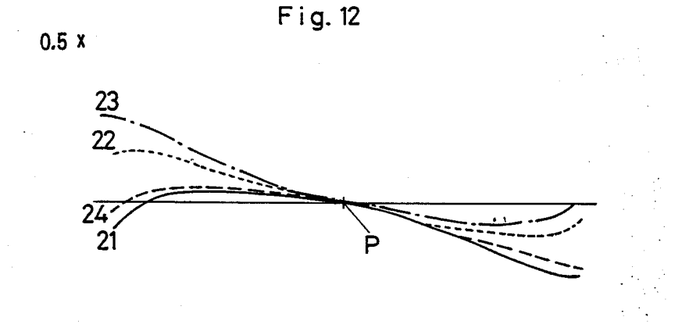
FIG. 12 is a diagram explaining coma aberration of the embodiment 1 of the invention set in −0.5x position while varying $\Delta t$.

FIG. 12 is a diagram of tangential coma aberrations in corner positions of the image area, observed when the lens system of the above-described embodiment 1 was set in $-0.5x$ position and $\Delta t$ was varied within the range of the conditional formulae.

FIG. 12 shows at 21 an example applying the axial space of equivalent scale.

FIG. 12 shows at 22 an example applying $\Delta t = 0.0026$.

FIG. 12 shows at 23 an example applying the upper limit value of $\Delta t = 0.0037$.

FIG. 12 shows at 24 an example applying the lower limit value of $\Delta t = 0.00065$.

It will be seen from FIG. 12 that the coma aberration is improved in examples 22 to 24 as compared with example 21 keeping the axial space of equivalent position.

It will be appreciated from the foregoing detailed description that, in accordance with the present invention, it becomes possible to satisfy the afore-mentioned requirements for duplicator lens system over a wide magnification range by using a fixed focus lens system instead of a zoom lens, providing a high performance quality lens of bright and wide field angle.

Although six lens elements are arranged in six groups in the foregoing embodiments, it is to be understood that the present invention includes in its scope the lens systems in which the lens element of each group is divided into and constituted by a number of parts or subelements designed in such a manner as to retain its own power to obtain similar effects.

What is claimed is:

1. A variable magnification duplicator lens system which comprises:
    front and rear lens groups each consisting of three lens elements located on each side of a stop, three on the subject side and three on the image-forming side of the stop;
    the lens elements on the subject side of said stop including a 1st lens element consisting of a meniscus lens having positive power and facing the convex side thereof toward the subject, a 2nd lens element consisting of a meniscus lens having negative power and facing the convex side thereof toward said subject, and a 3rd lens element having positive power;
    the lens elements group on the image-forming side of said stop including 4th to 6th lens elements arranged symmetrically with said 1st to 3rd lens elements on the subject side, respectively;
    at least one of said 1st and 6th lens elements being movable
    said lens system as a whole being moved in the direction of the optical axis at the time of varying the copy scale;
    in reduced scale position, the lens position being adjusted by at least one of lens shifts, a shift moving said 6th lens element toward said 5th lens element and a shift moving said 1st lens element away from said 2nd lens element; and
    in enlarged scale position, the lens position being adjusted by at least one of lens shifts, a shift moving said 1st lens element toward said 2nd lens element and a shift moving said 6th lens elements away from the 5th lens element.

2. The variable scale duplicator lens system of claim 1, wherein said 6th lens element is shifted toward said 5th lens element in reduced scale position, and said 1st lens element is shifted toward said 2nd lens element in enlarged scale position.

3. The variable scale duplicator lens system of claim 1, wherein said 1st lens element is shifted away from said 2nd lens element in reduced scale position, and said 6th lens element is shifted away from said 5th lens element in enlarged scale position.

4. The variable scale duplicator lens system of claim 1, wherein said 1st lens element is shifted toward said 2nd lens element in enlarged scale position, and said 1st lens elément is shifted away from said 2nd lens element in reduced scale position.

5. The variable scale duplicator lens system of claim 1, wherein said 6th lens element alone is movable, said 6th lens element being shifted away from said 5th lens element in enlarged scale position and toward said 5th lens element in reduced scale position.

6. The variable scale duplicator lens system of claim 1, wherein said 6th lens element is shifted toward said 5th lens element while said 1st lens element is shifted away from said 2nd lens in reduced scale position, and said 1st lens element is shifted toward said 2nd lens element while said 6th lens element is shifted away from said 5th lens element in enlarged scale position.

7. The variable scale duplicator lens system of claim 1, 2 or 3, wherein said lens elements are shifted into reduced scale position by adjusting at least either the axial space $t_2$ between said 1st and 2nd lens elements or the axial space $t_{10}$ between said 5th and 6th elements to satisfy the condition of $$-0.00216 \log|m| < \frac{\Delta t}{f} < -0.0123 \log|m|$$

and shifted into enlarged scale position by adjusting at least the axial space $t_2$ between said 1st and 2nd lens elements or the axial space $t_{10}$ between said 5th and 6th lens elements to satisfy the condition of $$-0.0123 \log|m| < \frac{\Delta t}{f} < -0.00216 \log|m|$$

where
f: focal length of whole system,
m; magnification
$\Delta t$: $\Delta t_2 - \Delta t_{10}$
$\Delta t_2$: the variation of axial space $t_2$ from the length in equivalent scale position, and
$\Delta t_{10}$: the variation of axial space $t_{10}$ from the length in equivalent scale position.

* * * * *